(12) United States Patent
Hirschfeld et al.

(10) Patent No.: US 9,451,001 B2
(45) Date of Patent: Sep. 20, 2016

(54) SOCIAL NETWORKING WITH VIDEO ANNOTATION

(71) Applicants: David Hirschfeld, Scottsdale, AZ (US); Barry Fernando, Phoenix, AZ (US); Mark C. Phelps, Tucson, AZ (US)

(72) Inventors: David Hirschfeld, Scottsdale, AZ (US); Barry Fernando, Phoenix, AZ (US); Mark C. Phelps, Tucson, AZ (US)

(73) Assignee: ART Research and Technology, L.L.C., Phoenix, AZ (US)

( * ) Notice: Subject to any disclaimer, the term of this patent is extended or adjusted under 35 U.S.C. 154(b) by 73 days.

(21) Appl. No.: 14/170,149

(22) Filed: Jan. 31, 2014

(65) Prior Publication Data
US 2014/0214966 A1 Jul. 31, 2014

Related U.S. Application Data

(60) Provisional application No. 61/759,219, filed on Jan. 31, 2013.

(51) Int. Cl.
G06F 15/16 (2006.01)
H04L 29/06 (2006.01)
G06Q 50/00 (2012.01)
H04L 12/58 (2006.01)

(52) U.S. Cl.
CPC .............. *H04L 65/602* (2013.01); *G06Q 50/01* (2013.01); *H04L 51/16* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 6,687,878 B1 * | 2/2004 | Eintracht | G06F 17/241 707/E17.117 |
| 2009/0248833 A1 * | 10/2009 | Frazier | G06F 17/30041 709/217 |
| 2011/0063317 A1 * | 3/2011 | Gharaat | G06Q 30/0244 345/545 |
| 2012/0284343 A1 | 11/2012 | Lee et al. | |
| 2012/0317210 A1 * | 12/2012 | Fisher | G06Q 10/107 709/206 |
| 2013/0046761 A1 * | 2/2013 | Soderberg | G06F 17/30038 707/736 |
| 2014/0075317 A1 * | 3/2014 | Dugan | G06F 3/04842 715/719 |

FOREIGN PATENT DOCUMENTS

| | | |
|---|---|---|
| JP | 2009-199500 A | 9/2009 |
| KR | 10-2010-0071359 A | 6/2010 |
| KR | 10-2011-0136308 A | 12/2011 |

OTHER PUBLICATIONS

International Preliminary Report on Patentability dated Aug. 4, 2015 for International Application No. PCT/US2014/014238.
PCT/US2014/014238—International Search Report and Written Opinion.

* cited by examiner

*Primary Examiner* — Brian P Whipple
(74) *Attorney, Agent, or Firm* — Dale F. Regelman; Quarles & Brady LLP (57) ABSTRACT

A method and system for annotating Playable Media Files in a social network having a plurality of members, wherein the method includes receiving the Playable Media File from a first member, receiving an annotation from another member, and embedding the annotation in the Playable Media File.

21 Claims, 4 Drawing Sheets

SOCIAL NETWORKING WITH VIDEO ANNOTATION

CROSS-REFERENCE TO RELATED APPLICATIONS

This application claims priority from a United States Provisional Patent Application filed on Jan. 31, 2013 and having a Ser. No. 61/759,219, the entire content of which is incorporated herein by reference.

FIELD OF THE INVENTION

Embodiments generally relate to assemblies, methods, devices, and systems for managing information, and more particularly, to assemblies, methods, devices, and systems for sharing and annotating video data between members of a social network.

SUMMARY OF THE INVENTION

In certain embodiments, a method for annotating Playable Media Files in a social network having a plurality of members is presented. By "Playable Media File," Applicants mean, without limitation: an audio file, a video file, an audiovisual file, slide show, AVI file, MP3 file, MP4 file, WMA file, WAV file, Flash, MPEG file. The method includes receiving the Playable Media File from a first member, receiving an annotation from another member, and embedding the annotation in the Playable Media File. In certain embodiments a specific location within the Playable Media File is specified along with the annotation and the annotation is embedded in the Playable Media File at that location. In certain embodiments the method further includes initiating a discussion thread within the Playable Media File at a specified location, where at least two members of the network can participate in the discussion.

In another embodiment, an article of manufacture is presented. The article of manufacture comprises a non-transitory computer readable medium having computer readable program code encoded therein to annotate Playable Media Files in a social network having a plurality of members. The computer readable program code has a series of computer readable program steps to effect receiving a Playable Media File from one member, receiving an annotation from another member, and embedding the annotation in the Playable Media File.

In yet other embodiments, a computer program product that is encoded in a non-transitory computer readable medium and usable with a programmable computer processor to annotate Playable Media Files in a social network having a plurality of members is presented. The computer program product includes computer readable program code that causes the programmable computer processor to receive a Playable Media File from one of the members, receive an annotation from another member, and embed the annotation in the Playable Media File.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF PREFERRED EMBODIMENTS

The invention is described in preferred embodiments in the following description with reference to the FIGs., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," "in certain embodiments," and similar language throughout this specification may, but do not necessarily, all refer to the same embodiment. It is noted that, as used in this description, the singular forms "a," "an" and "the" include plural referents unless the context clearly dictates otherwise.

The described features, structures, or characteristics of the invention(s) may be combined in any suitable manner in one or more embodiments. In the following description, numerous specific details are recited to provide a thorough understanding of embodiments of the invention(s). One skilled in the relevant art will recognize, however, that the invention(s) may be practiced without one or more of the specific details, or with other methods, components, materials, and an forth. In other instances, well-known structures, materials, or operations are not shown or described in detail to avoid obscuring aspects of the invention.

Applicants' system and method includes a social network wherein a video can be created using any available video format, and that video can be shared between a plurality of social network members. Moreover in certain embodiments, Applicants' system and method can be used by multiple members of a social network to add embedded annotations to a Playable Media File and to initiate discussion threads within the same.

Figure 1:
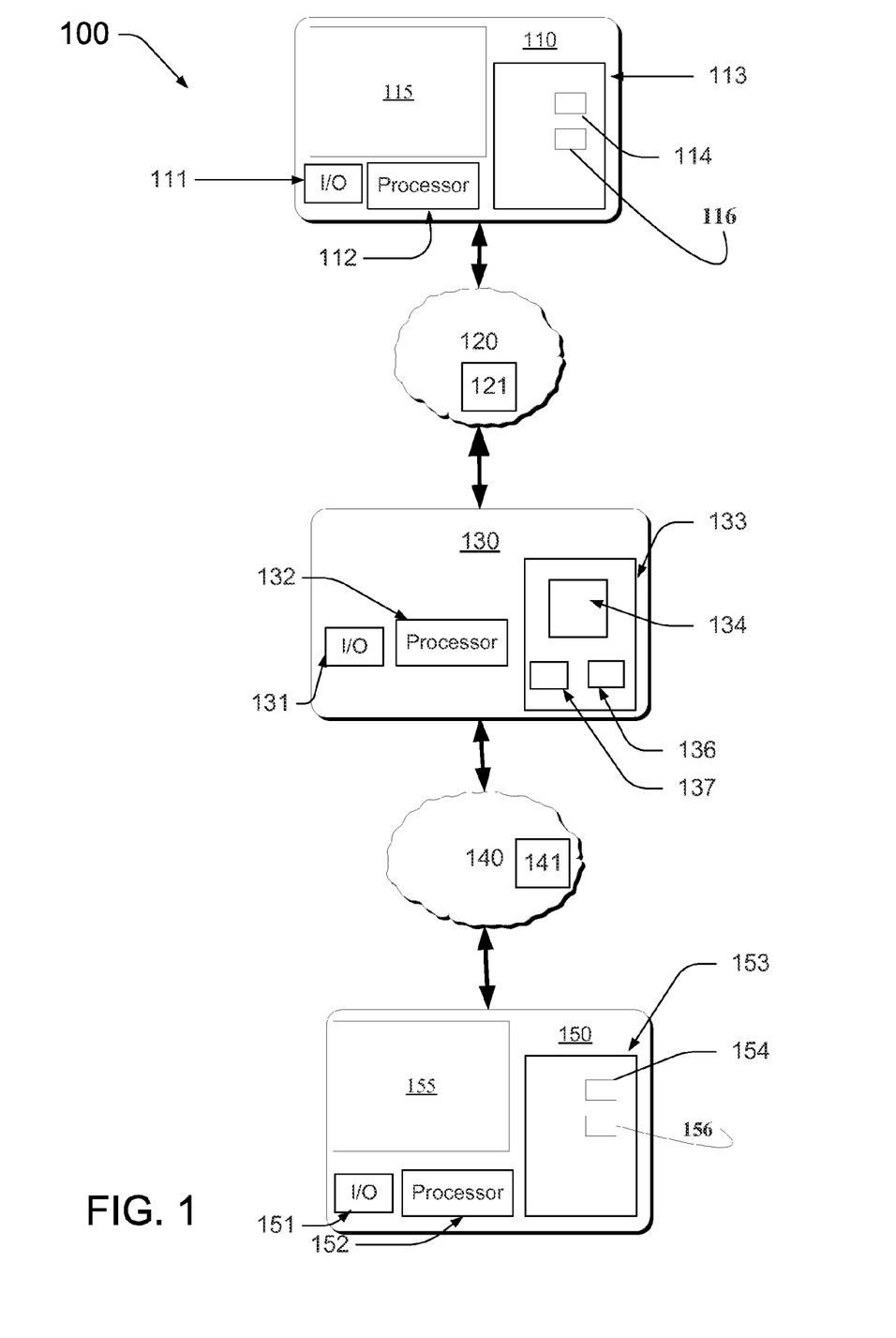
FIG. 1 illustrates an exemplary embodiment of a system for annotating video within a social network.

Referring to FIG. 1, a portion of Applicants' social network 100 is illustrated. In certain embodiments, Applicants' social network 100 is an open social network. In certain embodiments, Applicants' social network 100 is a closed social network.

In the illustrated embodiment of FIG. 1, social network 100 comprises asocial network server 130 that is communicatively connected to a computing device 110 through a first communication fabric 120 and a computing device 150 through a second communication fabric 140. In certain embodiments, the social network server 130 is owned and/or operated by a social networking service provider while computing devices 110 and 150 are owned and/or operated by users or members of the social network 100, where a member is a user that has a profile containing information about the member stored in information 137 of the social network server 130. In some embodiments, the computing device 110 is owned and operated by a first member and the computing device 150 is owned and operated by a second member.

For the sake of clarity, FIG. 1 shows a first computing device 110, social network server 130, and a second computing device 150. FIG. 1 should not be taken as limiting. Rather, in other embodiments any number of entities and corresponding devices can be part of the social network 100, and further, although FIG. 1 shows two communication fabrics 120 and 140, in other embodiments less or more than two communication fabrics is provided in the social network 100. For example, in certain embodiments, the communication fabric 120 and the communication fabric 140 are the same communication fabric.

In certain embodiments, the computing devices 110 and 150 and host 130 are each an article of manufacture. Examples of the article of manufacture include: a server, a mainframe computer, a mobile telephone, a smart telephone, a personal digital assistant, a personal computer, a laptop, a set-top box, an MP3 player, an email enabled device, a tablet computer, a web enabled device, or other special purpose computer each having one or more processors (e.g., a Central Processing Unit, a Graphical Processing Unit, or a microprocessor) that are configured to execute Applicants' API to receive information fields, transmit information fields, store information fields, or perform methods.

By way of illustration and not limitation, FIG. 1 illustrates the computing device 110, the social network server 130, and the computing device 150 as each including a processor 112, 132, and 152, respectively, a non-transitory computer readable medium 113, 133, and 153, respectively, having a series of instructions, an input/output means 111, 131, and 151, respectively, such as a keyboard, a mouse, a stylus, touch screen, a camera, a scanner, or a printer. Computer readable program code 114, 134, and 154 is encoded in non-transitory computer readable media 113, 133, and 153, respectively. Processors 112, 132, and 152 utilize computer readable program code 114, 134, and 154, respectively, to operate computing devices 110, 130, and 150, respectively. In certain embodiments, the computing device 110, 130, and 150 employ hardware and/or software that supports accelerometers, gyroscopes, magnetometers (e.g., solid state compasses) and the like.

Processors 112 and 152 access Application Program Interfaces (APIs) 116 and 156, respectively, encoded in computer readable media 113 and 153, respectively, to communicate with host 130 and access Applicants' algorithm 136 encoded in computer readable medium 133 to implement Applicants' social network and method described herein. Algorithm 136 comprises Applicants' source code to operate a public or private social network, and when implemented by computing device 110 causes a graphic user interface ("GUI") to be displayed on display screen 115, wherein that GUI comprises and displays a plurality of graphical interactable objects. A member using computing device 110 (or computing device 150) can utilize that GUI to access a logical volume, such as for example and without limitation logical volume 180 (FIG. 2), wherein information specific to that user are encoded in logical volume 180. The member and/or user can further utilize the GUI to access Applicants' social network as described herein.

Processor 132 accesses the computer readable program code 134, encoded on the non-transitory computer readable medium 133, and executes an instruction 136 to electronically communicate with the computing device 110 via the communication fabric 120 or electronically communicate with the computing device 150 via the communication fabric 140. Encoded information 137 is maintained of the data communicated or information fields communicated, e.g., date and time of transmission, frequency of transmission and the like, with any or all of the computing device 110 and the computing device 150. In certain embodiments, information 137 is analyzed and/or mined. In certain embodiments, information 137 is encoded in a plurality of individual logical volumes specific to each member/user.

In certain embodiments, computing devices 110 and 150 further comprise one or more display screens 115 and 155, respectively. In certain embodiments, display screens 115 and 155 comprise an LED display device.

In certain embodiments, the information fields received from the computing device 110 at the social network server 130 are exchanged with other computing devices not shown in FIG. 1. For example, information fields received from a social network in which the member has an Internet presence is sent to the social network server 130 and stored at the information 137 in association with a profile of the member. Alternatively, or in combination, the information fields transmitted from the computing device 110 to the social network server 130 is sent to an account of the member within the social network.

In certain embodiments, information 137 is encoded in one or more hard disk drives, tape cartridge libraries, optical disks, combinations thereof, and/or any suitable data storage medium, storing one or more databases, or the components thereof, in a single location or in multiple locations, or as an array such as a Direct Access Storage Device (DASD), redundant array of independent disks (RA/D), virtualization device, etc. In certain embodiments, information 137 is structured by a database model, such as a relational model, a hierarchical model, a network model, an entity-relationship model, an object-oriented model, or a combination thereof. For example, in certain embodiments, the information 137 is structured in a relational model that stores a plurality of Identities for each of a plurality of members as attributes in a matrix.

In certain embodiments, the computing devices 110, 130, and 150 include wired and/or wireless communication devices which employ various communication protocols including near field (e.g., "Blue Tooth") and/or far field communication capabilities (e.g., satellite communication or communication to cell sites of a cellular network) that support any number of services such as: telephony, Short Message Service (SMS) for text messaging, Multimedia Messaging Service (MMS) for transfer of photographs and videos, electronic mail (email) access, or Global Positioning System (GPS) service, for example.

As illustrated in FIG. 1, the communication fabrics 120 and 140 each comprise one or more switches 121 and 141, respectively. In certain embodiments, communication fabrics 120 and 140 are the same. In certain embodiments, at least one of the communication fabrics 120 and 140 comprises the Internet, an intranet, an extranet, a storage area network (SAN), a wide area network (WAN), a local area network (LAN), a virtual private network, a satellite communications network, an interactive television network, or any combination of the foregoing. In certain embodiments, at least one of the communication fabrics 120 and 140 contains either or both wired or wireless connections for the transmission of signals including electrical connections, magnetic connections, or a combination thereof. Examples of these types of connections include: radio frequency connections, optical connections, telephone links, a Digital Subscriber Line, or a cable link. Moreover, communication fabrics 120 and 140 utilize any of a variety of communication protocols, such as Transmission Control Protocol/Internet Protocol (TCP/IP), for example.

Figure 2:
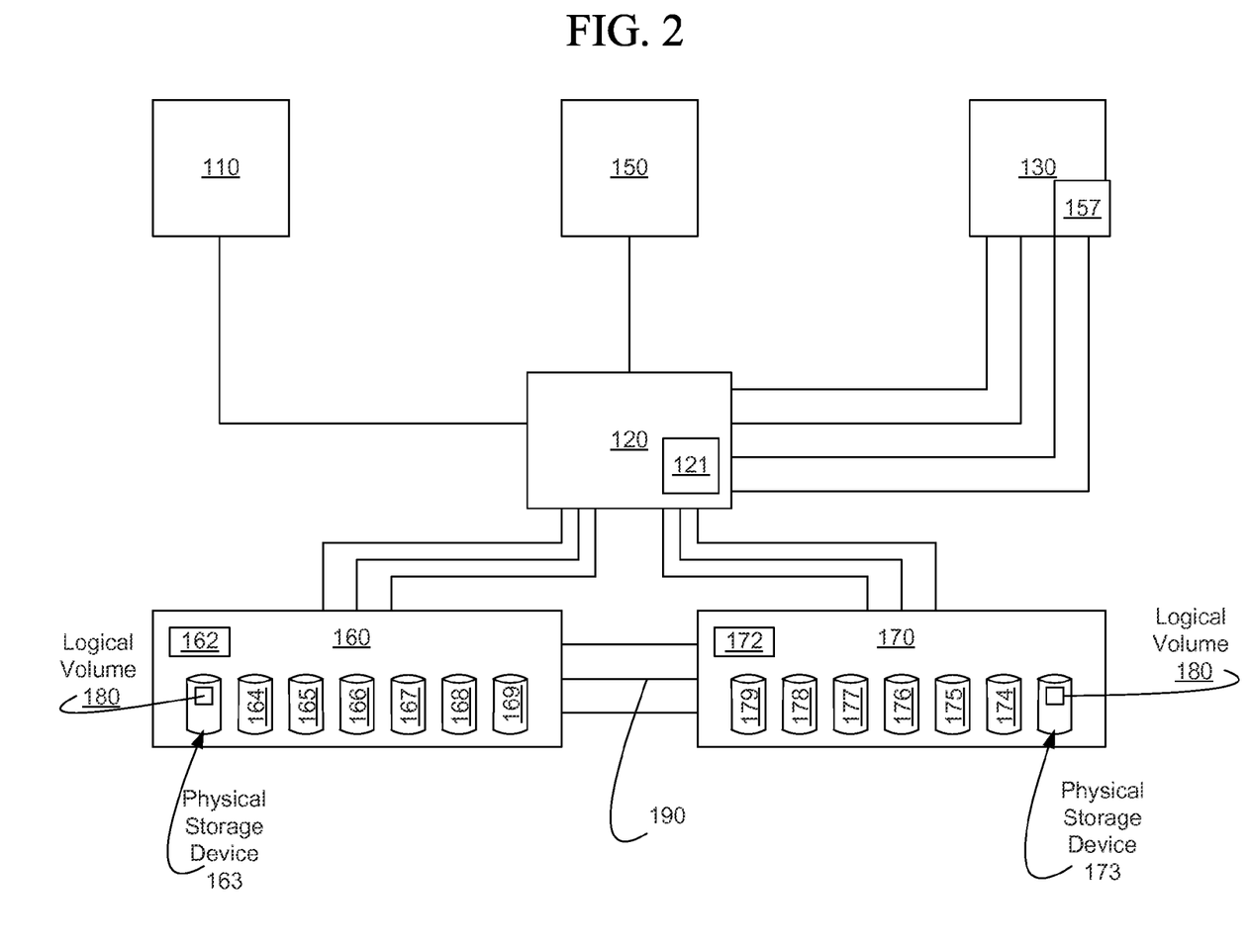
FIG. 2 illustrates another exemplary embodiment of a system for annotating video within a social network.

Referring to FIG. 2, the computing devices 110, 130 and 150 are each communicatively connected to the communication fabric 120, such as a WAN or Internet. The social network server 130 is a computing device that is owned and/or operated by a social networking service provider and computing devices 110 and 150 are computing devices that are owned and/or operated by a user or member of the system. In certain embodiments, the social network server 130 provides access to the computing devices 110 and 150 to execute Applicants' source code 136 via a Software as a Service (SaaS) means.

In certain embodiments information fields are received from one or more computing devices 110, 130 and/or 150 and stored on the "Cloud" such as data storage library 160 and/or 170. Referring to FIG. 2, each of the data storage libraries 160 and 170 have corresponding physical storage devices, such as and without limitation physical data storage devices 163-169 for data storage library 160 and 173-179 for data storage library 170.

In certain embodiments, data storage library 160 and data storage library 170 are configured in a Peer To Peer Remote Copy ("PPRC") storage system, wherein the information fields in data storage library 160 is automatically backed up in data storage library 170. In certain embodiments, Applicants' PPRC storage system utilizes synchronous copying. In certain embodiments, Applicants' PPRC storage system utilizes asynchronous copying.

In the illustrated embodiment of FIG. 2, physical storage device 163 is configured to comprise logical volume 180. In certain embodiments, each physical storage device in data storage library 160 is configured to comprise a plurality of logical volumes. Similarly, each physical storage device in data storage library 170 is configured to comprise a corresponding plurality of logical volumes. In certain embodiments, each member of the social network is assigned a unique logical volume. In such embodiments a permission file 157 may be encoded in computer readable medium 133 or in data storage libraries 160 and 170 that associates each logical volume with a social network member and further associates each logical volume with access permissions for certain designated other social network users. Each social network user configures his/her own logical volume permissions. In certain embodiments, if a first user desires to remove access permissions from a second user, that first member simply accesses his/her permissions file and deletes the second user. Thereafter, the second user cannot retrieve data stored on the logical volume associated with the first user.

Figure 3:
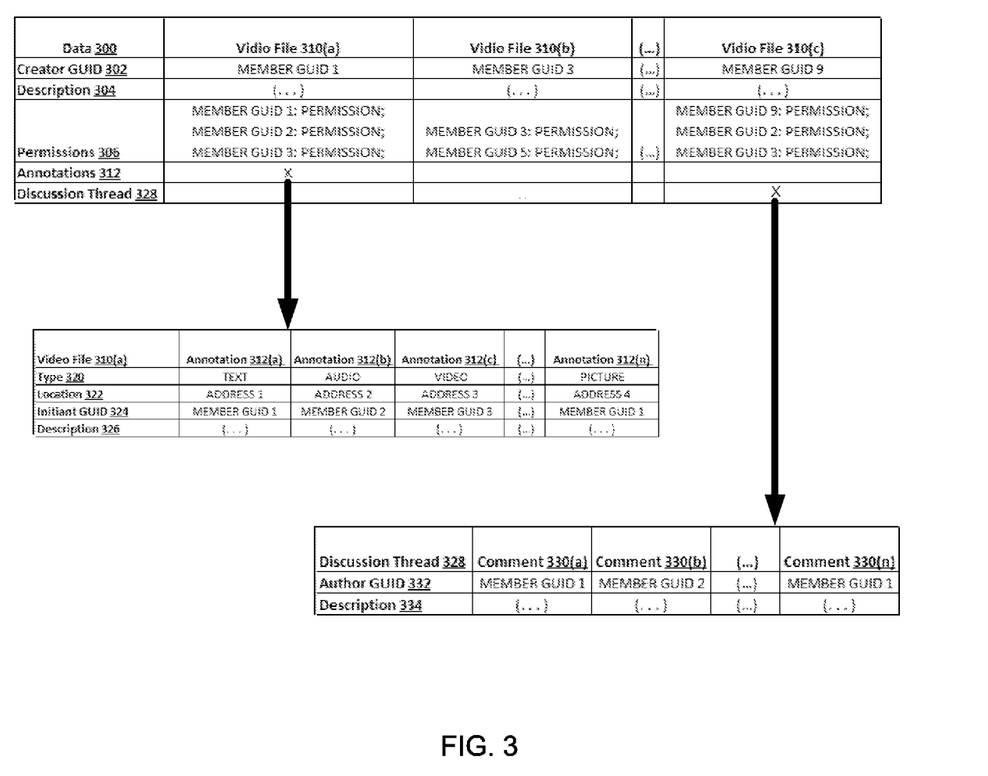
FIG. 3 is a table of information fields stored in association with each Playable Media File.

Referring to FIGS. 1, 2, and 3, Applicants' algorithm 136, and its functions, can be accessed by users of Applicants' social network 100 to create, share, edit, and/or annotate a Playable Media File. One member, using a computing device such as computing device 110 or 150, to access social network server 130, uploads a Playable Media File to social network 100, storing the same on data storage library 160 or 170. In certain embodiments the Playable Media File is stored on the unique logical volume assigned to the member. Once uploaded, the member can grant access to the Playable Media File to one or more other members by storing the access permissions in permission file 157. In certain embodiments the access includes levels such as, and without limitation, view only, view/edit, view/edit/share, and the like. In certain embodiments the access includes conditions or restrictions such as expirations dates, limitations on the number of times the file can be viewed, and the like.

Referring specifically to FIG. 3, upon uploading the Playable Media File to social network 100, a data profile 300 is created for the Playable Media File and is stored on data storage library 160 or 170. Data profile 300 includes various information fields, including the Global Unique Identifier (GUID) 302 associated with the creating member, a description 304 of the Playable Media File (e.g., a title), and permissions 306 held by various members to access, edit, and/or share the Playable Media File. Data profile 300 may further include subsequently added annotations 312 and discussion threads 328.

Applicants' algorithm 136 provides the ability for each user having access to the Playable Media File stored on data storage library 160 or 170 (or those having the correct permissions) to edit the Playable Media File by adding annotations at various locations within the file. Such annotations may be any known format and may include text, video, audio, pictures, or a combination thereof, and may be embedded directly into the Playable Media File or may be stored as a separate file. When subsequent viewers execute the Playable Media File the annotation will be visible at the specific time segment. In certain such embodiments, the annotation is shown in the same window as the Playable Media File and may be visible over the Playable Media File. In other embodiments, the annotation is shown in a separate window. In yet other embodiments Applicants' algorithm 136 generates a time line which displays the Playable Media File's time scale and tracks the annotations.

In certain embodiments, the member creating the annotation can set permissions for the annotation, restricting who can view or edit the annotation. In such embodiments, the permissions are stored in permission file 157.

For those Playable Media Files having annotations, data profile 300 further contains information fields concerning each annotation 312(a)-(n), including one or more of the type 320 of the annotation (text, audio, video, picture, etc.), the location 322 of the associated annotation within the Playable Media File, the GUID 324 of the member who initiated the annotation, and a description 326 for the annotation, such as a title or other descriptor.

In certain embodiments Applicants' algorithm 136 further generates a table of contents of the annotations added to the Playable Media File using the information in data profile 300, including a link to each annotation. The link may be in the form of a pointer, electronic bookmark, hyperlink, or any other type of link. Where the link is a hyperlink, the hyperlink may link to an annotation that is embedded within the Playable Media File or one that is saved as a different file on data storage library 160 or 170. Where the annotation is remote from the Playable Media File, the annotation may be viewed and edited separately from the Playable Media File. For each new annotation added to the Playable Media File, Applicants' algorithm 136 updates the table of contents. In such embodiments, the table of contents may include one or more of a caption or other description of the annotation, the time of the annotation within the Playable Media File, the author of the annotation, and the date and/or time the annotation was made.

In certain embodiments Applicants' algorithm 136 can further be used to initiate an embedded discussion thread at a specific location within the Playable Media File. In such embodiments, upon receiving a request from a member, Applicants' algorithm 136 generates the discussion thread at a location within the Playable Media File specified by the member. In certain embodiments the request further includes a type identifier indicating whether the discussion thread is to be open or closed. Where the open identifier is provided, the discussion thread is open to all members and therefore any member may view and add a comment to the discussion thread. Where the closed identifier is provided, the discussion thread is private and only available to particular members. In such embodiments the request provided by the initiating member includes identifiers for one or more members that are to have access to the discussion thread. In certain such embodiments Applicants' algorithm 136 further sends invitations to the identified members to invite them to participate in the thread. In certain such embodiments, the permissions given to various members to access and participate in the discussion thread is stored in permissions file 157.

Members having access to the Playable Media File can then add written, audible, pictorial, or video comments to the thread, which are posted in the sequence in which they are espoused by the members. In certain embodiments only members having edit privileges can post in the embedded discussion thread. In certain embodiments only individuals having specific discussion thread privileges can post in the embedded discussion thread. In certain embodiments, the privilege to post in an embedded thread is specific to the particular thread, and therefore a member may have access to post in one thread but not another. In certain embodiments, the discussion thread is visible to any individual viewing the Playable Media File. In other embodiments, the discussion thread is visible only to certain individuals, such as those that have been given specific access to the thread or those that have edit privileges for the video.

For Playable Media Files having discussion threads, data profile 300 further includes information fields for each discussion thread 328, including for each comment 330(*a*)-(*n*) made in the discussion thread by a member, the GUID of the member author of the comment, and a description 334, which may be the comment itself or another identifier.

While the information field of data profile 300 illustrated in FIG. 3 show the primary information that is recorded, FIG. 3 is meant to be illustrative and not limiting. In certain embodiments other data fields are included, such as and without limitation, the data and time the Playable Media File was updated, the history of the Playable Media File, including the identity of any member who viewed or edited the Playable Media Files and the date and time the file was viewed or edited, the size of the data file, and similar information for each annotation and discussion thread. In other embodiments data profile 300 may have fewer than the information fields illustrated in FIG. 3.

Figure 4:
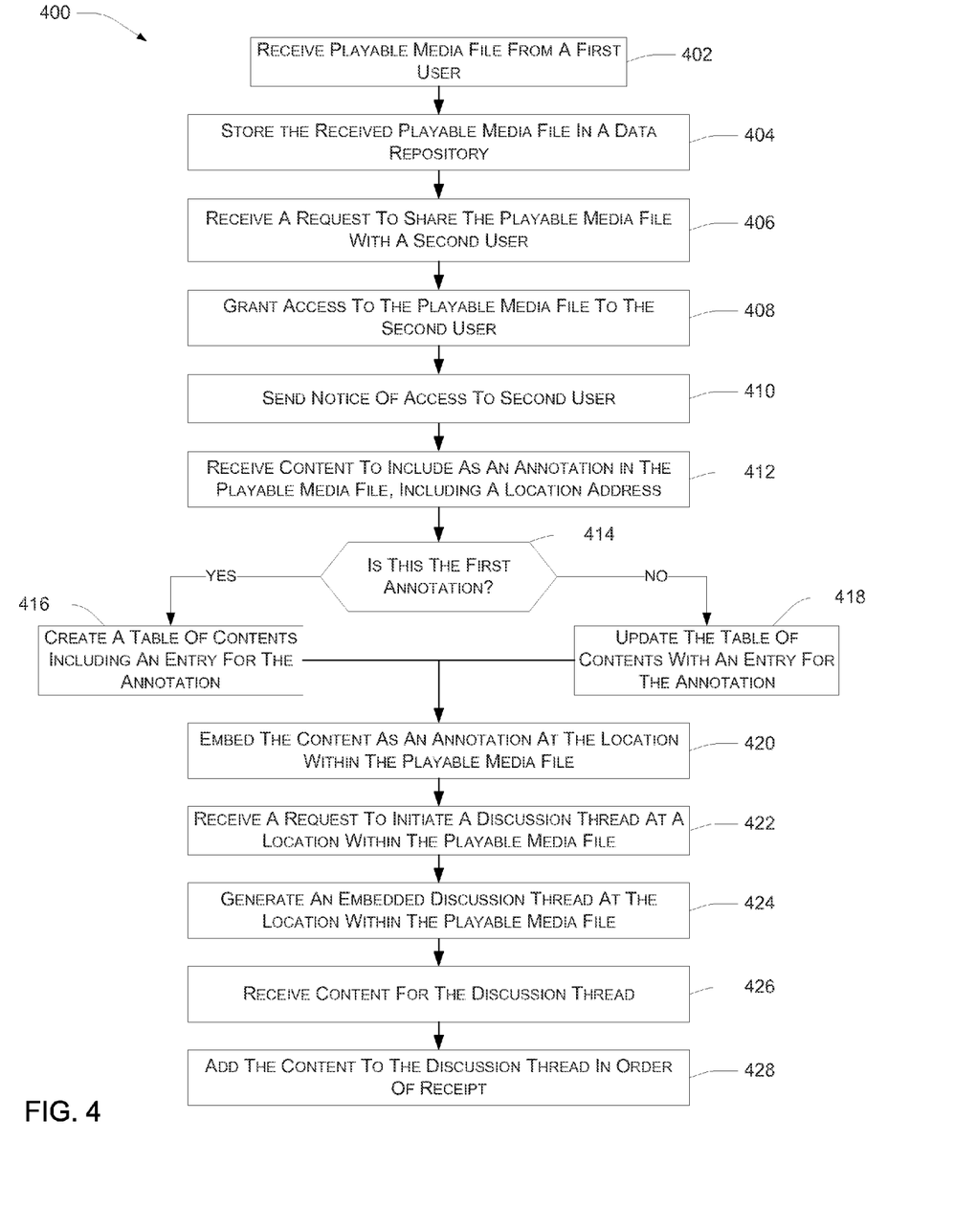
FIG. 4 is a flowchart of the method and/or process related to annotating Playable Media File within a social network.

Referring to FIG. 4, a flowchart summarizes an exemplary method 400 for managing and annotating Playable Media Files shared between members of a social network via the system of FIG. 1 and/or FIG. 2. As is depicted in block 402, a Playable Media File is received from a first user by social network 100. For example, a first member using computing device 110 uploads a Playable Media File to social network 100 through communication fabric 120. In certain embodiments additional information is submitted with the Playable Media File such as a description of the file. The Playable Media File and associated information is then stored in a data repository, as indicated by block 404. For example, the social network server 130 stores the received Playable Media File in logical volume 180 of data storage library 160, which is associated with the member submitting the file. The associated information may further be used to populate data profile 300 (FIG. 3), which includes data for a plurality of Playable Media Files.

In certain embodiments, a request to share the Playable Media File with one or more members of the social network 100 may be received separately from the Playable Media File, as is indicated in block 406. In other embodiments, the request is submitted with the Playable Media File in step 402. In certain embodiments the request to share the Playable Media File includes permission levels for each member identified in the requests, such as, and without limitation, view only, view/edit, view/edit/share. In response, access is granted to the members identified, as is indicated by block 408. For example, upon receipt of the information, network server 300 may store the access information and permission level in field 306 (FIG. 3) of data profile 300 and/or in permissions file 157 (FIG. 2). In certain embodiments an invitation or other notice is then sent to the members who were given access, as indicated by block 410. For example, network server 130 transmits a communication through communication fabric 140 to computing device 150 of the second member, notifying the second member that he or she now has access to the Playable Media File. In certain embodiments the notice may further include a link to the Playable Media File or information about where and how to access the Playable Media File.

As indicated by block 412, network 100 may receive content to include as an annotation in the Playable Media File and a specified location within the file. For example the second member, after viewing the Playable Media File stored on logical volume 180 associated with the first member, may edit the file by providing a picture and text to server 130 to be included as an annotation from the minute 1.5 to minute 2 of the Playable Media File. As indicated by blocks 414, 416, and 418, if the annotation is the first annotation for the Playable Media File, a table of contents is created for the file which includes an entry for the annotation submitted. Alternatively, if the annotation is not the first and the Playable Media File already has a table of contents, the table of contents is updated to include an entry for the annotation. For example, upon receipt of an annotation from computing device 150 of the second user, network server 130 determines if the Playable Media File already has annotations (and thus a table of contents) by checking annotations field 312 (FIG. 3) of data profile 300. If no annotations are included in the Playable Media File, the network server 130 creates a table of contents using the data in data profile 300 and the annotation and any related information received from computing device 150. In certain embodiments the table of contents is then embedded in the Playable Media File. In other embodiments, the table of contents is stored separately on logical volume 180 with the Playable Media File. In certain such embodiments, the table of contents is associated with the Playable Media File such that it is always presented to a user viewing the Playable Media File. In other embodiments, the table of contents may be viewed separately from the Playable Media File.

As indicated by block 420, the annotation is then embedded in the Playable Media File at the location indicated in the request. For example, network server 130 edits the Playable Media File stored in logical volume 180 to display (or play in the case of audio or video annotations) the material provided by the second user at minute 1.5 to minute 2 of the video. In certain embodiments network server 130 further updates the information fields of data profile 300 associated with the annotation just embedded, such as fields 320, 322, 324, and 326 for annotation 312(*a*) (FIG. 3).

As indicated by block 422, network 100 may further receive a request to initiate a discussion thread at a location within a Playable Media File. For example, the first member, using computing device 110, may send a request to network server 130 via communication fabric 120 to include a discussion thread in the Playable Media File at minute 5 of the video. In certain embodiments the request further includes additional information such as whether the requested discussion thread is to be open or closed or identifiers for other members of network 100 who will have access to view and/or participate in the discussion.

Upon receiving such a request, an embedded discussion thread is generated at the specified location within the Playable Media File, as indicated by block 424. For example, network server 130 generates an embedded discussion thread at minute 5 having the access permissions specified by the first user. In certain embodiments, the generation further includes updating or populating the associated fields, such as fields 332 and 334 (FIG. 3), of data profile 100. In certain embodiments, generating the embedded discussion threads further includes storing the permission information in permissions file 157.

As indicated by blocks 426 and 428, in certain embodiments content for the discussion thread is then received by network 100 and added to the embedded discussion thread. In certain embodiments, the initial content for the discussion thread is sent with the request to initiate the same. For example, the first member, having sent the request to initiate a discussion thread, may send a first text comment to network server 130. Upon receipt of the comment, network server 130 edits the discussion thread with the comment provided. The second member, using computing device 150, may then send to network server 130 a second comment in response to the first comment. The second comment may be in a different format than the first, by way of example an audio comment or a picture. Network server 130 then further edits the discussion thread to include the second comment after the first comment.

The schematic flow chart diagrams included are generally set forth as a logical flow-chart diagram (e.g., FIG. 4). As such, the depicted order and labeled steps are indicative of one embodiment of the presented method. In certain embodiments, other steps and methods are conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types are employed in the flow-chart diagrams, they are understood not to limit the scope of the corresponding method (e.g., FIG. 4). Indeed, some arrows or other connectors may be used to indicate only the logical flow of the method. For instance, an arrow indicates a waiting or monitoring period of unspecified duration between enumerated steps of the depicted method. Additionally, the order in which a particular method occurs may or may not strictly adhere to the order of the corresponding steps shown.

In certain embodiments, individual steps recited in FIG. 4 are combined, eliminated, or reordered.

In certain embodiments, Applicants' invention includes an article of manufacture comprising a platform for information management, such as computing device 110, 130, and/or 150, comprising computer readable program code, such as API 116, API 156, and/or Applicants' social network source code 136, residing in a non-transitory computer readable medium, such as computer readable medium 113, 133, and/or 153, where that computer readable program code can be executed by a processor, such as processor 112 (FIG. 1) and/or 132 (FIG. 1), and/or 152, to implement Applicants' social network source code.

In summary, a user accesses a MEDIA (regardless if the media file is on the user's device or is accessed through a remote streaming connection). Once the MEDIA is accessed the user can associate multiple indexes, each referencing a specific point in time in the MEDIA. Each MEDIA index comprises a "MEDIA Point".

Each MEDIA Point references a specific point in time the MEDIA. A user may create and associate an annotation to each MEDIA Point. Each Annotation may include other attached MEDIA, Image(s) and/or a URL(s).

Each MEDIA Point may be stored in a user created folder structure for the purpose of organizing multiple MEDIA Points for later reference. Each MEDIA Point may be shared with one or more users via a social network of users.

Each shared MEDIA Point gives recipients direct access to the point in the MEDIA referenced by the MEDIA Point. Each shared MEDIA Point includes any associated annotation(s) including any attached MEDIA, Image(s) or URL(s). Each shared MEDIA Point allows the network of users with whom the MEDIA Point was shared to engage in one or more discussions, each discussion associated a MEDIA Point.

In certain embodiments, Applicants' social network source code resides in a computer program product, where that computer program product comprises computer readable program code that can be executed by a computing device. In either case, in certain embodiments, the computer readable program code is encoded in a non-transitory computer readable medium comprising, for example, a magnetic information storage medium, an optical information storage medium, an electronic information storage medium, and the like. "Electronic storage media," means, for example and without limitation, one or more devices, such as and without limitation, a PROM, EPROM, EEPROM, Flash PROM, compactflash, smartmedia, and the like.

Examples of computer readable program code include, but are not limited to, micro-code or micro-instructions, machine instructions, such as produced by a compiler, code used to produce a web service, and files containing higher-level instructions that are executed by a computer using an interpreter. For example, embodiments are be implemented using Java, C++, or other programming languages (e.g., object-oriented programming languages) and development tools. Additional examples of computer code include, but are not limited to, control signals, encrypted code, and compressed code.

While the preferred embodiments of the present invention have been illustrated in detail, it should be apparent that modifications and adaptations to those embodiments may occur to one skilled in the art without departing from the scope of the present invention as set forth herein.

We claim:

1. A method to annotate Playable Media Files in a social network having a plurality of members, comprising:
   receiving by a member of said social network a Playable Media File;
   creating by said member of said social network an annotation relating to said Playable Media File;
   providing said annotation by said member of said social network to a network server;
   providing a data profile by said member of said social network to said network server, wherein said data profile comprises a location in said Playable Media File where said annotation should be embedded;
   embedding by said network server said annotation in the Playable Media File at said location;
   determining by said network server if said annotation is a first annotation submitted for said Playable media File;
   if said annotation is not a first annotation submitted for said Playable Media File, encoding said data profile in a previously-created table of contents for said Playable Media File;

if said annotation is a first annotation submitted for said Playable Media File:
creating a table of contents by said network server for said Playable Media File;
encoding by said network server said data profile in said table of contents;
wherein said Playable Media File is selected from the group consisting of an audio file, a video file, an audiovisual file, slide show, AVI file, MP3 file, MP4 file, WMA file, WAV file, Flash, MPEG file.

2. The method of claim 1, further comprising: receiving first content;
forming said annotation using said first content.

3. The method of claim 2, further comprising: determining if said annotation comprises a first annotation embedded in said Playable Media File; when said annotation comprises a first annotation embedded in said Playable Media File, creating a table of contents including an entry for said annotation.

4. The method of claim 3, further comprising when said annotation does not comprises a first annotation embedded in said Playable Media File, updating a table of content an entry for said annotation.

5. The method of claim 3, further comprising: receiving a request to initiate a discussion thread at a location within said Playable Media File; and generate an embedded discussion at said location within said Playable Media File.

6. The method of claim 5, further comprising: receiving second content; and adding said second content to said discussion.

7. The method of claim 6, further comprising: receiving a plurality of additional content in a sequential order; and add said plurality of additional content in said sequential order.

8. An article of manufacture comprising a non-transitory computer readable medium having computer readable program code encoded therein to annotate Playable Media Files in a social network having a plurality of members, the computer readable program code comprising a series of computer readable program steps to effect:
receiving by a member of said social network a Playable Media File;
creating by said member of said social network an annotation relating to said Playable Media File;
providing said annotation by said member of said social network to a network server;
providing a data profile by said member of said social network to said network server, wherein said data profile comprises a location in said Playable Media File where said annotation should be embedded;
embedding by said network server said annotation in the Playable Media File at said location;
determining by said network server if said annotation is a first annotation submitted for said Playable media File;
if said annotation is not a first annotation submitted for said Playable Media File, encoding said data profile in a previously-created table of contents for said Playable Media File;
if said annotation is a first annotation submitted for said Playable Media File;
creating a table of contents by said network server for said Playable Media File;
encoding by said network server said data profile in said table of contents.

9. The article of manufacture of claim 8, said computer readable program code further comprising a series of computer readable program steps to effect: receiving first content; forming said annotation using said first content.

10. The article of manufacture of claim 9, said computer readable program code further comprising a series of computer readable program steps to effect: determining if said annotation comprises a first annotation embedded in said Playable Media File; when said annotation comprises a first annotation embedded in said Playable Media File, creating a table of contents including an entry for said annotation.

11. The article of manufacture of claim 10, said computer readable program code further comprising a series of computer readable program steps to effect when said annotation does not comprises a first annotation embedded in said Playable Media File, updating a table of content an entry for said annotation.

12. The article of manufacture of claim 10, said computer readable program code further comprising a series of computer readable program steps to effect: receiving a request to initiate a discussion thread at a location within said Playable Media File; and generate an embedded discussion at said location within said Playable Media File.

13. The article of manufacture of claim 12, said computer readable program code further comprising a series of computer readable program steps to effect: receiving second content; and adding said second content to said discussion.

14. The article of manufacture of claim 13, said computer readable program code further comprising a series of computer readable program steps to effect: receiving a plurality of additional content in a sequential order; and add said plurality of additional content in said sequential order.

15. A computer program product encoded in a non-transitory computer readable medium and usable with a programmable computer processor to annotate Playable Media Files in a social network having a plurality of members, comprising:
computer readable program code which causes said programmable computer processor to receive by a member of said social network a Playable Media File;
computer readable program code which causes said programmable computer processor to create by said member of said social network an annotation relating to said Playable Media File;
computer readable program code which causes said programmable computer processor to provide said annotation by said member of said social network to a network server;
computer readable program code which causes said programmable computer processor to provide a data profile by said member of said social network to said network server, wherein said data profile comprises a location in said Playable Media File where said annotation should be embedded;
computer readable program code which causes said programmable computer processor to embed by said network server said annotation in the Playable Media File at said location;
computer readable program code which causes said programmable computer processor to determine by said network server if said annotation is a first annotation submitted for said Playable media File;
computer readable program code which causes said programmable computer processor to if said annotation is not a first annotation submitted for said Playable Media File, encoding said data profile in a previously-created table of contents for said Playable Media File;
computer readable program code which causes said programmable computer processor to if said annotation is a first annotation submitted for said Playable Media File:

computer readable program code which causes said programmable computer processor to create a table of contents by said network server for said Playable Media File;

computer readable program code which causes said programmable computer processor to encode by said network server said data profile in said table of contents.

16. The computer program product of claim 15, further comprising: computer readable program code which causes said programmable computer processor to receive first content; computer readable program code which causes said programmable computer processor to form said annotation using said first content.

17. The computer program product of claim 16, further comprising: computer readable program code which causes said programmable computer processor to determine if said annotation comprises a first annotation embedded in said Playable Media File; computer readable program code which, when said annotation comprises a first annotation embedded in said Playable Media File, causes said programmable computer processor to create a table of contents including an entry for said annotation.

18. The computer program product of claim 16, further comprising computer readable program code which, when said annotation does not comprises a first annotation embedded in said Playable Media File, causes said programmable computer processor to update a table of content an entry for said annotation.

19. The computer program product of claim 17, further comprising: computer readable program code which causes said programmable computer processor to receive a request to initiate a discussion thread at a location within said Playable Media File; and computer readable program code which causes said programmable computer processor to generate an embedded discussion at said location within said Playable Media File.

20. The computer program product of claim 19, further comprising: computer readable program code which causes said programmable computer processor to receive second content; and computer readable program code which causes said programmable computer processor to add said second content to said discussion.

21. The computer program product of claim 20, further comprising: computer readable program code which causes said programmable computer processor to receive a plurality of additional content in a sequential order; and computer readable program code which causes said programmable computer processor to add said plurality of additional content in said sequential order.

* * * * *